June 27, 1972  M. GREEN  3,672,732

DUAL HYDRAULIC BRAKING SYSTEMS FOR VEHICLES

Filed May 18, 1970

United States Patent Office 3,672,732
Patented June 27, 1972

3,672,732
DUAL HYDRAULIC BRAKING SYSTEMS FOR VEHICLES
Martin Green, Solihull, England, assignor to Girling Limited, Birmingham, England
Filed May 18, 1970, Ser. No. 38,195
Claims priority, application Great Britain, July 1, 1969, 33,171/69
Int. Cl. B60t *17/22*
U.S. Cl. 303—84 A
10 Claims

ABSTRACT OF THE DISCLOSURE

In means for detecting pressure differentials between hydraulic circuits in a dual braking system a piston assembly is mounted in the bore of a valve housing and has opposed ends subjected to the pressures of the two hydraulic circuits. The assembly comprises a piston slidable in two sleeves which in turn are slidable in the bore. The sleeves are limited in their movement towards each other by a stop fixed in the bore. The piston and sleeves are keyed together against movement of the piston away from the stop relative to the sleeves. Thus when pressure on one end of the assembly differs substantially from the other end, the piston and one sleeve move towards the low pressure end and in so doing actuate indicator means. When the pressures become substantially equal again the pressure at one end acts on the end of the piston and said one sleeve to move the piston against equal pressure acting on the smaller area of the other end of the piston, the other sleeve remaining unmoved. This renders the indicator means again inoperative.

---

This invention relates to dual hydraulic braking systems of the kind in which separate brake circuits, for example brakes on front and rear wheels of a vehicle, are supplied with fluid under pressure from at least one pedal-operated master cylinder.

The separate brake circuits may be supplied with fluid under pressure from separate master cylinders which are adapted to be actuated simultaneously, or from separate pressure spaces of a tandem master cylinder, and each master cylinder or pressure space is supplied with hydraulic fluid from at least one hydrostatic reservoir or from a source of fluid under pressure, for example a pump or hydraulic accumulator.

The present invention is concerned particularly with providing means for incorporation in a dual hydraulic braking system of the kind set forth to indicate when a differential between the pressures of the brake circuits exceeds a predetermined value.

According to our invention in means for detecting when a differential between the pressure of the brake circuits of a dual hydraulic braking system exceeds a predetermined value opposite ends of an assembly comprising a pair of sleeves working in a bore in a valve housing and a piston working through aligned axial bores in the sleeves are adapted to be exposed to pressures applied to the brake circuits and, when the pressure differential is below a predetermined value, the sleeves are prevented from moving in directions towards each other by stop means fixed relative to the bore and the assembly is held in a central position, the sleeves and the piston being keyed together against axial movement of the piston relative to the sleeves in directions away from the stop means to permit movement of one of the sleeves with the piston relative to the other sleeve when the pressure differential to which opposite ends of the assembly are subjected exceeds the said predetermined value, the said movement of the sleeve and the piston actuating means for indicating that said pressure differential is in excess of the said predetermined value, whereafter, upon the said pressure differential being decreased to a value less than the said predetermined value, the force applied to the assembly by the pressure acting on the area of the end of the assembly comprising the piston and the said one sleeve is greater than the force applied to the opposite end of the assembly by the pressure acting on the other end, which is effective only over the area of the piston, whereby the assembly is restored to its initial position and the indicating means are rendered inoperative.

Preferably adjacent ends of the sleeve engage with opposite ends of a stop member extending into the bore through an opening in the housing at an inermediate point in the axial length of the housing, and the indicating means comprises an electric switch having a stem which extends through a central bore in the stop member and is received at its free end in an annular recess of substantially V-shaped section in the piston at an intermediate point in the length of the piston. Thus, axial movement of the piston relative to the bore moves the stem axially to complete an electrical circuit and actuate an electrical lamp mounted on a part of a vehicle within the vision of the driver, for example, the dashboard, to provide a visual indication of the differential pressure.

One embodiment of our invention is illustrated in the accompanying drawing in which.

Figure 1:
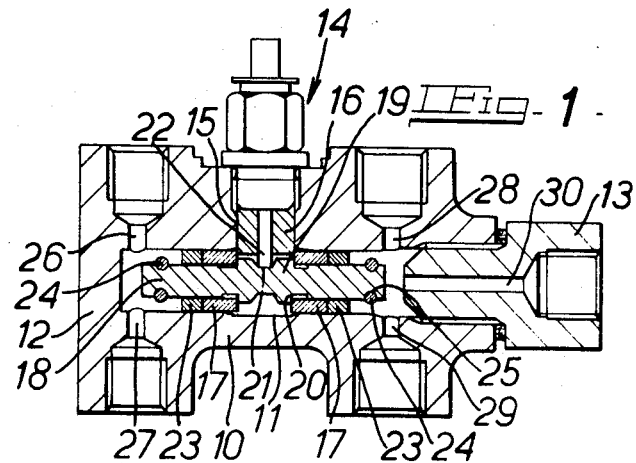
FIG. 1 is a longitudinal section through a valve unit.

The valve unit illustrated in FIG. 1 comprises a housing 10 formed with a cylindrical axial bore 11 which is closed at one end by an end wall 12 of the housing and at the other by a plug 13 screwed into the open end of the bore.

An electric switch assembly 14 is screwed into a radial opening 15 in the wall of the housing 10 and the body 16 of the switch assembly projects into the bore by a distance. The opening 15 is located at the mid-point in the length of the portion of the bore 11 between the end wall 12 and the inner end of the plug 13.

A pair of opposed sleeves 17 work in the portion of the bore 11 on opposite sides of the body 16. Normally the sleeves, at their adjacent inner ends, abut against opposite sides of the body 16 which form a stop preventing further movement of the sleeves towards each other, and the body 16 projects into the bore by a distance less than the radial thickness of the walls of the sleeves.

A piston 18 working through aligned bores in the sleeves 17 is provided with a central portion 19 in increased diameter of a length substantially equal to the distance between the faces of the body against which the sleeves abut, so that shoulder 20 at opposite ends of the central portion 19 also engage with the adjacent inner end of the sleeves. The central portion 19 is of a diameter such that a clearance is provided between itself and the inner end of the body 16. An annular recess 21 at substantially the central point in the axial length of the central portion receives the inner end of a stem 22 which is guided in the switch body 16 for axial movement to actuate switch contacts when the piston 18 is moved axially.

Seals 23 are provided between opposite end portions of the piston 18 and the wall of the cylindrical bore 11 and circlips or other spring rings 24 housed in annular precesses 25 at opposite ends of the pioston 18 prevent separation of the piston 18 from the assemblies formed by the sleeves 17 and the seals 23. The possible distance of movement of the piston is limited by the end wall 12 of the housing and the plug 13 which act as end stops.

The valve housing 10 is provided at each end with a pair of radial ports 26, 27 and 28 and 29 which lead into portions of the bore 11 at opposite ends of the piston 18, and the plug 13 is provided with an axial passage 30 leading into an adjacent end of the bore 11.

The valve unit is connected in lines between pressure space of a tandem master cylinder and the brakes on front and rear wheels of a vehicle. The master cylinder includes a primary pressure space located in a cylinder bore between a positively actuated main piston and a secondary or floating piston, and a secondary pressure spaced located between the secondary piston and an end wall of the cylinder bore. The primary pressure space is connected to the port 29, and the secondary pressure space is connected to the port 27. The port 26 is connected to slave cylinders of brakes on rear wheels of the vehicle, and the port 28 and the passage 30 are connected to slave cylinders of brakes on opposite front wheels of the vehicle.

When the tandem master cylinder and the brakes are operating satisfactorily, the pressures applied to opposite ends of the piston 18 and the sleeves 17 are equal and the unit is held in the position shown in the drawing with the piston held in a central position and the sleeves 17 engaging with opposite sides of the switch body 16 forming a stop.

When the pressure applied from one of the pressure spaces to a set of brakes fails, for example through fracture of a braking line, or failure of the pressure space of one of the slave cylinders, the pressure in the other line acting on the opposite end of the piston 18 moves the piston 18 axially. This movement causes the stem 22 of the electric switch to be depressed thereby closing the electrical contacts and completing an electrical circuit to energise a lamp indicating to the user that one of the pressure lines has ceased to function. During this movement the piston 18 carries with it the sleeve 17 at the end of the bore of less pressure, due to the engagement of the shoulder 20 at that end of the central portion 19 with that sleeve. The other sleeve is held against axial movement by its engagement with the stop 16.

After the fault in the line has been rectified when the tandem master cylinder is again operated equal pressure will again be applied to opposite ends of the bore 11. Since the sleeve in the end of the bore in which pressure failure has occurred previously is displaced from the stop 14, the pressure at that end is now effective over the area of that end of the piston 18 and also over the outer end of the displaced sleeve 17. Thus the force acting on that end of the assembly formed by the piston and the sleeves is greater than the force at the other end of the bore which comprises an equal pressure effective over the area of that end of the piston 18. The assembly is then moved axially in the opposite direction into the inoperative position shown in the drawings. Thus our invention provides brake failure warning means incorporating automatic reset characteristics.

The valve unit in accordance with our invention will operate as described above under the conditions where the pressure differential acting between opposite ends of the assembly comprising the piston 18 and the sleeves 17 exceeds a predetermined value.

Figure 2:
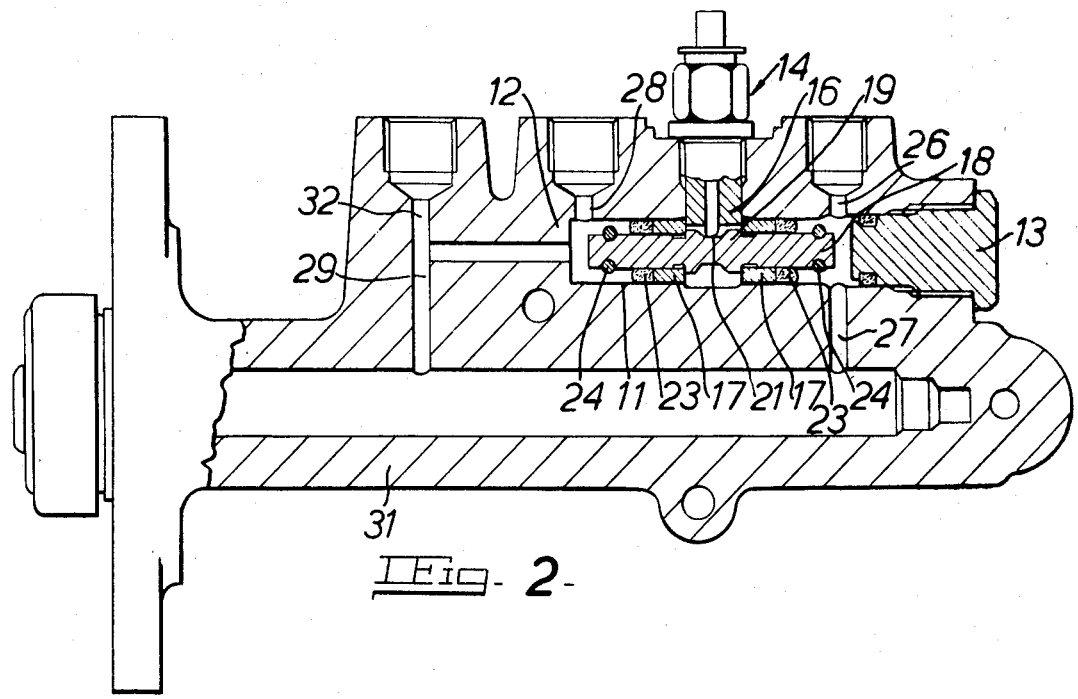
FIG. 2 is a longitudinal section through a tandem master cylinder incorporating the valve unit of FIG. 1.

The valve unit need not be separate from the master cylinder. As illustrated in FIG. 2 where corresponding reference numerals have been used to indicate corresponding parts the valve unit incorporated into the body 31 of a tandem master cylinder. In this example the passage 28 in the plug 13 is omitted and is replaced by a passage 32.

I claim:

1. Means for detecting when a differential between the pressures of separate brake circuits of a dual hydraulic braking system exceeds a predetermined value comprising a valve housing having a longitudinally extending bore of a constant section through its length, fluid pressure inlet means communicating with said bore, a piston assembly movably mounted in said bore and adapted to be exposed at opposite ends to pressures applied to the brake circuits and transmitted to said bore by said fluid pressure inlet means, and indicator means for indicating when said piston assembly has moved away from a neutral position in response to a pressure differential between the brake circuits, said piston assembly comprising a pair of sleeves working in said bore and having aligned axial bores, and a piston working through said aligned axial bores of said sleeves and comprising a one-piece member, wherein stop means fixed relative to said bore of said housing are operative to prevent movement of said sleeves towards each other, said stop means comprising a plug located in said housing and having an inner end projecting into said bore at an intermediate point in the length of said bore positioned between adjacent ends of said sleeves, said inner end having opposite ends with which said sleeves are adapted to engage, and means are provided for keying said sleeves to said piston to prevent axial movement of said piston relative to said sleeves in directions away from said stop means whereby, when the pressure differential to which opposite ends of the piston assembly is subjected is below a predetermined value, said sleeves are prevented by said stop means from moving towards each other but, when the pressure differential exceeds said predetermined value, said piston moves with one sleeve relative to the other sleeve which remains stationary relative to the bore and the indicator means become operative, whereafter, upon the pressure differential being decreased to a value less than said predetermined value, the force applied to the said piston assembly by pressure acting on the area of the end of the piston and said one sleeve is greater than the force acting on the opposite end of said piston whereby said piston assembly is restored to said neutral position and the indicating means are rendered inoperative.

2. Means as claimed in claim 1, wherein said indicating means comprises an electric switch.

3. Means as claimed in claim 1, wherein said indicating means comprises an electric switch, a stem constituting the operating member of said electric switch extends through a central bore in said stop member and terminates at a free innermost end, and wherein said piston has at an intermediate point in its length an annular recess of substantially V-shaped section said free innermost end in said annular recess.

4. Means as claimed in claim 1, wherein said piston assembly incorporates a central portion of increased diameter and of a length substantially equal to the width of said stop member, and opposite ends of said central portion provide shoulders against which adjacent ends of said sleeves are adapted to abut to key said sleeves and said piston together against axial movement of said piston relative to said sleeves in directions away from said stop member.

5. Means as claimed in claim 1, having first and second end stops fixed with respect to the housing, said end stops limiting movement of said piston with respect to said housing.

6. Means as claimed in claim 5, wherein said first end stop comprises a closed end of said bore and said second end stop comprises a plug fitted into the opposite end of the bore.

7. Means as claimed in claim 1, wherein said plug is removably mounted in said housing, and said indicating means comprises a switch having a body formed by said plug.

8. A dual hydraulic braking system comprising a tandem master cylinder having primary and secondary pressure spaces supplied with hydraulic fluid and at least one slave cylinder for applying a wheel brake hydraulically connected to each of said pressure spaces and there is interposed between said master cylinder and said slave cylinders means for detecting when a pressure differential between pressures within said pressure spaces exceeds a predetermined value, said means comprising a valve housing having a longitudinally extending bore of constant section throughout its length, fluid pressure inlet means communicating with said bore and connected to said pressure spaces, a piston assembly movably mounted in said bore and adapted to be exposed at opposite ends to pressures applied to the brake circuits and transmitted to said bore by said fluid pressure inlet means, and indicator means for indicating when said piston assembly has moved away from a neutral position in response to a pressure differential between the brake circuits, said piston assembly comprising a pair of sleeves working in said bore and having aligned axial bores, and a piston working through said aligned axial bores of said sleeves and comprising a one-piece member, wherein stop means fixed relative to said bore of said housing are operative to prevent movement of said sleeves towards each other, said stop means comprising a plug located in said housing and having an inner end projecting into said bore at an intermediate point in the length of said bore positioned between adjacent ends of said sleeve, said inner end having opposite ends with which said sleeves are adapted to engage, and means are provided for keying said sleeves to said piston to prevent axial movement of said piston relative to said sleeves in directions away from said stop means whereby, when the pressure differential to which opposite ends of the piston assembly is subjected is below a predetermined value, said sleeves are prevented by said stop means from moving towards each other but, when the pressure differential exceeds said predetermined value, said piston moves with one sleeve relative to the other sleeve which remains stationary relative to the bore and the indicator means become operative, whereafter, upon the pressure differential being decreased to a value less than said predetermined value, the force applied to the said piston assembly by pressure acting on the area of the end of the piston and said one sleeve is greater than the force acting on the opposite end of said piston whereby said piston assembly is restored to said neutral position and the indicating means are rendered inoperative.

9. An hydraulic braking system comprising two separate master cylinders each having a pressure space supplied with hydraulic fluid and being adapted to be operated simultaneously, and at least one slave cylinder for applying a wheel brake hydraulically connected to said of said pressure spaces, and there is interposed between said master cylinder and said slave cylinders means for detecting when a pressure differential between pressures within said pressure spaces exceeds a predetermined value, said means comprising a valve housing having a longitudinally extending bore of a constant section throughout its length, fluid pressure inlet means communicating with said bore and connected to said pressure spaces, a piston assembly movably mounted in said bore and adapted to be exposed at opposite ends to pressures applied to the brake circuits and transmitted to said bore by said fluid pressure inlet means, and indicator means for indicating when said piston assembly has moved away from a neutral position in response to a pressure differential between the brake circuits, said piston assembly comprising a pair of sleeves working in said bore and having aligned axial bores, and a piston working through said aligned axial bores of said sleeves and comprising a one-piece member, wherein stop means fixed relative to said bore of said housing are operative to prevent movement of said sleeves towards each other, said stop means comprising a plug located in said housing and having an inner end projecting into said bore at an intermediate point in the length of said bore positioned between adjacent ends of said sleeves, said inner end having opposite ends with which said sleeves are adapted to engage, and means are provided for keying said sleeves to said piston to prevent axial movement of said piston relative to said sleeves in directions away from said stop means, whereby, when the pressure differential to which opposite ends of the piston assembly is subjected, is below a predetermined value, said sleeves are prevented by said stop means from moving towards each other but, when the pressure differential exceeds said predetermined value, said piston moves with one sleeve relative to the other sleeve which remains stationary relative to the bore and the indicator means become operative, whereafter, upon the pressure differential being decreased to a value less than said predetermined value, the force applied to the said piston assembly by pressure acting on the area of the end of the piston and said one sleeve is greater than the force acting on the opposite end of said piston whereby said piston assembly is restored to said neutral position and the indicating means are rendered inoperative.

10. A tandem master cylinder comprising a housing including a primary and a secondary pressure space, and there is incorporated within said housing means for detecting when a pressure differential between pressures within said pressure spaces exceeds a predetermined value, said means comprising a longitudinally extending bore within said housing of a constant section throughout its length, fluid pressure communication means interconnecting said bore with said pressure spaces, a piston assembly movably mounted in said bore and adapted to be exposed at opposite ends to pressures within said pressure spaces and indicator means for indicating when said piston assembly has moved away from a neutral position in response to a pressure differential between the brake circuits, said piston assembly comprising a pair of sleeves working in said bore and having aligned axial bores, and a piston working through said aligned axial bores of said sleeves and comprising a one-piece member, wherein stop means fixed relative to said bore of said housing are operative to prevent movement of said sleeves towards each other, said stop means comprising a plug located in said housing and having an inner end projecting into said bore at an intermediate point in the length of said bore positioned between adjacent ends of said sleeves, said inner end having opposite ends with which said sleeves are adapted to engage, and means are provided for keying said sleeves to said piston to prevent axial movement of said piston relative to said sleeves in directions away from said stop means, whereby, when the pressure differential to which opposite ends of the piston assembly is subjected is below a predetermined value, said sleeves are prevented by said stop means from moving towards each other but, when the pressure differential exceeds said predetermined value, said piston moves with one sleeve relative to the other sleeve which remains stationary relative to the bore and the indicator means become operative whereafter, upon the pressure differential being decreased to a value less than said predetermined value, the force applied to the said piston assembly by pressure acting on the area of the end of the piston and said one sleeve is greater than the force acting on the opposite end of said piston whereby said piston assembly is restored to said neutral position and the indicating means are rendered inoperative.

References Cited

UNITED STATES PATENTS

| 3,480,333 | 11/1969 | Stelzer | 303—6 C |
| 3,382,333 | 5/1968 | Ihnacik | 303—84 A X |
| 3,394,401 | 7/1968 | Roberts | 303—84 AUX |
| 3,427,582 | 2/1969 | Brandon | 303—84 AUX |
| 3,542,438 | 11/1970 | Falk | 188—151 AX |

DUANE A. REGER, Primary Examiner

J. J. McLAUGHLIN, Assistant Examiner

U.S. Cl. X.R.

60—546 E; 188—151 A; 200—82 D; 340—52 C